US012558663B2

(12) United States Patent
Matsubara et al.

(10) Patent No.: US 12,558,663 B2
(45) Date of Patent: Feb. 24, 2026

(54) NEGATIVE ION SOURCE AND NEGATIVE ION GENERATION METHOD

(71) Applicant: JAPAN ATOMIC ENERGY AGENCY, Naka-gun (JP)

(72) Inventors: Akihiro Matsubara, Toki (JP); Yoko Kokubu, Toki (JP)

(73) Assignee: JAPAN ATOMIC ENERGY AGENCY, Naka-gun (JP)

( * ) Notice: Subject to any disclaimer, the term of this patent is extended or adjusted under 35 U.S.C. 154(b) by 493 days.

(21) Appl. No.: 18/166,669

(22) Filed: Feb. 9, 2023

(65) Prior Publication Data

US 2023/0256408 A1 Aug. 17, 2023

(30) Foreign Application Priority Data

Feb. 16, 2022 (JP) ................................. 2022-021830

(51) Int. Cl.
| | |
|---|---|
| *H01J 27/02* | (2006.01) |
| *B01J 19/08* | (2006.01) |
| *H05H 1/46* | (2006.01) |

(52) U.S. Cl.
CPC ........... *B01J 19/088* (2013.01); *H01J 27/028* (2013.01); *H05H 1/4622* (2021.05); *B01J 2219/0894* (2013.01)

(58) Field of Classification Search
CPC ........ H01J 27/16; H01J 27/028; B01J 19/088; B01J 2219/0894; B01J 2219/0896; B01J 2219/0898; H05H 1/4622
See application file for complete search history.

(56) References Cited

U.S. PATENT DOCUMENTS 4,377,773 A * 3/1983 Hershcovitch ........ H01J 27/028
315/111.21
4,559,477 A * 12/1985 Leung ................... H01J 27/028
313/363.1
(Continued)

FOREIGN PATENT DOCUMENTS

| CN | 113643950 A | 11/2021 |
|---|---|---|
| JP | H01225042 A | 9/1989 |

(Continued)

OTHER PUBLICATIONS

Plasek et al., "Modeling and Development of the RF-Controlled Hollow Cathode Concept", 49th AIAA/ASME/SAE/ASEE Joint Propulsion Conference, 2013, pp. 1-20.
(Continued)

*Primary Examiner* — Wyatt A Stoffa
(74) *Attorney, Agent, or Firm* — Lucas & Mercanti, LLP

(57) ABSTRACT

Provided is a negative ion source and a negative ion generation method capable of providing a high negative ion generation efficiency. A negative ion source includes a housing that includes: an inlet from which a sample is introduced; a plasma generation region communicated with the inlet, a plasma being generated by discharge in the plasma generation region; a negative ion generation region in which particles dissociated or excited by a reaction of the generated plasma with the sample are converted into negative ions; and an extraction port communicated with the negative ion generation region, the generated negative ions being extracted outside through the extraction port. The negative ion generation region is filled with a thermionic emission material for generating thermoelectrons by high frequency heating.

14 Claims, 4 Drawing Sheets

(56) References Cited

U.S. PATENT DOCUMENTS

| | | | | |
|---|---|---|---|---|
| 5,138,169 | A * | 8/1992 | Yamazaki | H01J 37/073 |
| | | | | 250/398 |
| 5,391,962 | A * | 2/1995 | Roberts | H01J 27/20 |
| | | | | 315/111.81 |
| 5,438,194 | A * | 8/1995 | Koudijs | H01J 49/0086 |
| | | | | 250/288 |
| 5,581,156 | A * | 12/1996 | Roberts | H01J 27/18 |
| | | | | 315/111.81 |
| 6,949,735 | B1 * | 9/2005 | Hatakeyama | H01J 37/321 |
| | | | | 250/251 |
| 7,943,913 | B2 * | 5/2011 | Balakin | H05H 13/04 |
| | | | | 250/424 |
| 8,501,136 | B2 * | 8/2013 | Qin | C04B 35/62227 |
| | | | | 423/276 |
| 9,299,525 | B2 * | 3/2016 | Kobayashi | H01J 1/148 |
| 9,899,193 | B1 * | 2/2018 | Koo | H01J 37/32449 |
| 2004/0104683 | A1 * | 6/2004 | Leung | H01J 27/18 |
| | | | | 315/111.21 |
| 2006/0028114 | A1 * | 2/2006 | Steenbrink | B82Y 10/00 |
| | | | | 313/345 |
| 2009/0166554 | A1 * | 7/2009 | Radovanov | H01J 37/08 |
| | | | | 250/424 |
| 2013/0043119 | A1 * | 2/2013 | Xia | B01J 19/088 |
| | | | | 422/186.04 |
| 2014/0219407 | A1 * | 8/2014 | Wong | G21B 1/05 |
| | | | | 376/127 |
| 2022/0367142 | A1 * | 11/2022 | Preikszas | H01J 37/28 |

FOREIGN PATENT DOCUMENTS

| | | |
|---|---|---|
| JP | H05128977 A | 5/1993 |
| JP | 2019075264 A | 5/2019 |
| KR | 101794965 B1 | 11/2017 |

OTHER PUBLICATIONS

European Search Report for Corresponding European Patent Application No. 23156548.2, Jul. 17, 2023, 6 pages.

Oguri, "Progress of Long-Time Operation and Industrial Use of Negative Ion Source for Particle Accelerator", J. Plasma Fusion Res., 2019, vol. 95, No. 7, pp. 340-344. English translation 5 pages.

Freeman et al., "Radiocarbon positive-ion mass spectrometry", Nuclear Instruments and Methods in Physics Research B, 2015, vol. 361, pp. 229-232.

"New Microwave Energy Technology and its Applications", edited by editorial board of latest edition of microwave energy and applied technology, published by Industrial Technology Service Center, 2014, vol. 11, pp. 89-92, 907-910. English translation 9 pages.

* cited by examiner

NEGATIVE ION SOURCE AND NEGATIVE ION GENERATION METHOD

CROSS REFERENCE TO RELATED APPLICATIONS

The present application claims priority from Japanese patent application JP 2022-021830 filed on Feb. 16, 2022, the entire content of which is hereby incorporated by reference into this application.

BACKGROUND

Technical Field

The present invention relates to a negative ion source and a negative ion generation method, and more specifically, relates to a negative ion source and a negative ion generation method using a thermionic emission material that generates thermoelectrons by heating.

Background Art

Conventionally, in the ion beam analysis, the accelerator mass spectrometry, the field of medical radiation, such as positron emission tomography (PET), and the industrial field, such as a manufacturing process of semiconductor integrated circuit, a negative ion source for generating negative ion beams has been used. Especially, since the negative ions can keep a higher charge conversion efficiency from negative electric charge to neutral or positive electric charge at higher energies than positive ions, the research and development of negative ions have been increasingly conducted in recent years.

Examples of conventional art on the negative ion source includes those as follows.

Plasma Fusion Res. 95 (2019) p. 340-344 discloses a negative ion source of filament driven type in which lanthanum hexaboride (LaB$_6$) sintered in a filament shape is heated by applying a current, and a plasma is generated by arc discharge using the filament-shaped lanthanum hexaboride as a cathode to generate negative ions.

JP 2019-75264 A discloses the use of a ceramic such as LaB$_6$ having a low work function as a charge converter for generating negative ions in a negative ion source assumed to be used in a neutral beam injector that is one of heating devices of fusion plasma.

JP H05-128977 A discloses an ion source configured to supply a microwave and a gas in a plasma chamber in a magnetic field, ionize the gas in the plasma chamber, and guide the ions outside. The ion source includes a gas inlet tube disposed to be communicated with the plasma chamber to introduce the gas, and a thermoelectron generation material arranged at a distal end of the gas inlet tube.

Nucl. Instr. Meth. Phys. Res. B, 361 (2015) p. 229-232. describes a negative ion generation mechanism in which a plasma generation region is spatially separated from a negative ion generation region. In this generation mechanism, positive ions are generated with plasma of a relatively high density of several eV caused by electron cyclotron resonance at first, the generated positive ions are accelerated to be guided to a gas cell in a beam line, and negative ions are generated by charge conversion caused by collision with gas atoms in the gas cell.

SUMMARY

In the negative ion generation methods described in JP 2019-75264 A, JP H05-128977 A, and Plasma Fusion Res.

95 (2019) p. 340-344, the negative ions are generated in the plasma having the electron temperature of several eV, and extracted. However, considering that electron affinities of substances contained in the gas to be ionized are about 1 eV, electron detachment occurs due to the collision between the generated negative ions and the plasma electrons, and the loss of the negative ions cannot be ignored.

To suppress this, as described in Nucl. Instr. Meth. Phys. Res. B, 361 (2015) p. 229-232, it is considered that after the positive ions are generated in the plasma region, the positive ions are guided into the gas cell different from the plasma region, and converted into negative ions.

However, in Nucl. Instr. Meth. Phys. Res. B, 361 (2015) p. 229-232, in addition to the low negative ion generation efficiency of less than about 10% in using the gas cell, another problem arises in that angular straggling of the negative ions is increased by the collision of the negative ions and the gas atoms in the gas cell, and the extraction efficiency of the generated negative ions is also decreased.

Furthermore, in the conventional art, for example, as described in Plasma Fusion Res. 95 (2019) p. 340-344, the filament-shaped thermionic emission material of LaB$_6$ is used as the arc discharge electrode. This is for heating the thermionic emission material by applying the current to the filament-shaped thermionic emission material. Therefore, the shape of the thermionic emission material is limited to the shape ensuring the conductive state like an electric wire serving as a part of an electric circuit. For taking out a large amount of thermoelectrons to increase the negative ion generation efficiency, it is preferred to increase a surface area of the thermionic emission material. However, it is difficult to increase the surface area by thinning and lengthening or narrowing and lengthening the thermionic emission material while keeping the filament shape, and additionally, constantly applying the current possibly breaks the filament.

As described above, the conventional negative ion source has problems in achieving sufficient negative ion generation efficiency due to the various kinds of factors.

The present invention has been developed in consideration of the above-described problems, and provides a negative ion source and a negative ion generation method capable of suppressing a loss of generated negative ions and ensuring a sufficient negative ion generation area, and consequently capable of providing a high negative ion generation efficiency.

To solve the above-described problems, a negative ion source according to one embodiment of the present invention comprises a housing including: an inlet from which a sample is introduced; a plasma generation region communicated with the inlet, a plasma being generated by discharge in the plasma generation region; a negative ion generation region in which particles dissociated or excited by a reaction of the generated plasma with the sample are converted into negative ions; and an extraction port communicated with the negative ion generation region, the generated negative ions being extracted outside through the extraction port. The negative ion generation region is filled with a thermionic emission material capable of generating thermoelectrons by heating.

A negative ion generation method according to one embodiment of the present invention uses the above-described negative ion source. The method comprises the processes of irradiating the plasma generation region and the negative ion generation region with the electromagnetic wave, introducing the sample into the plasma generation region through the inlet; and passing the generated dissociated particles and excited particles through the negative ion generation region.

With the present invention, since the generation of the thermoelectrons in the thermionic emission material is greatly enhanced compared with the conventional one and the loss of the generated negative ions is also suppressed, the generation efficiency of the negative ions can be significantly improved.

DETAILED DESCRIPTION

The following describes embodiments using the drawings.

Figure 1:
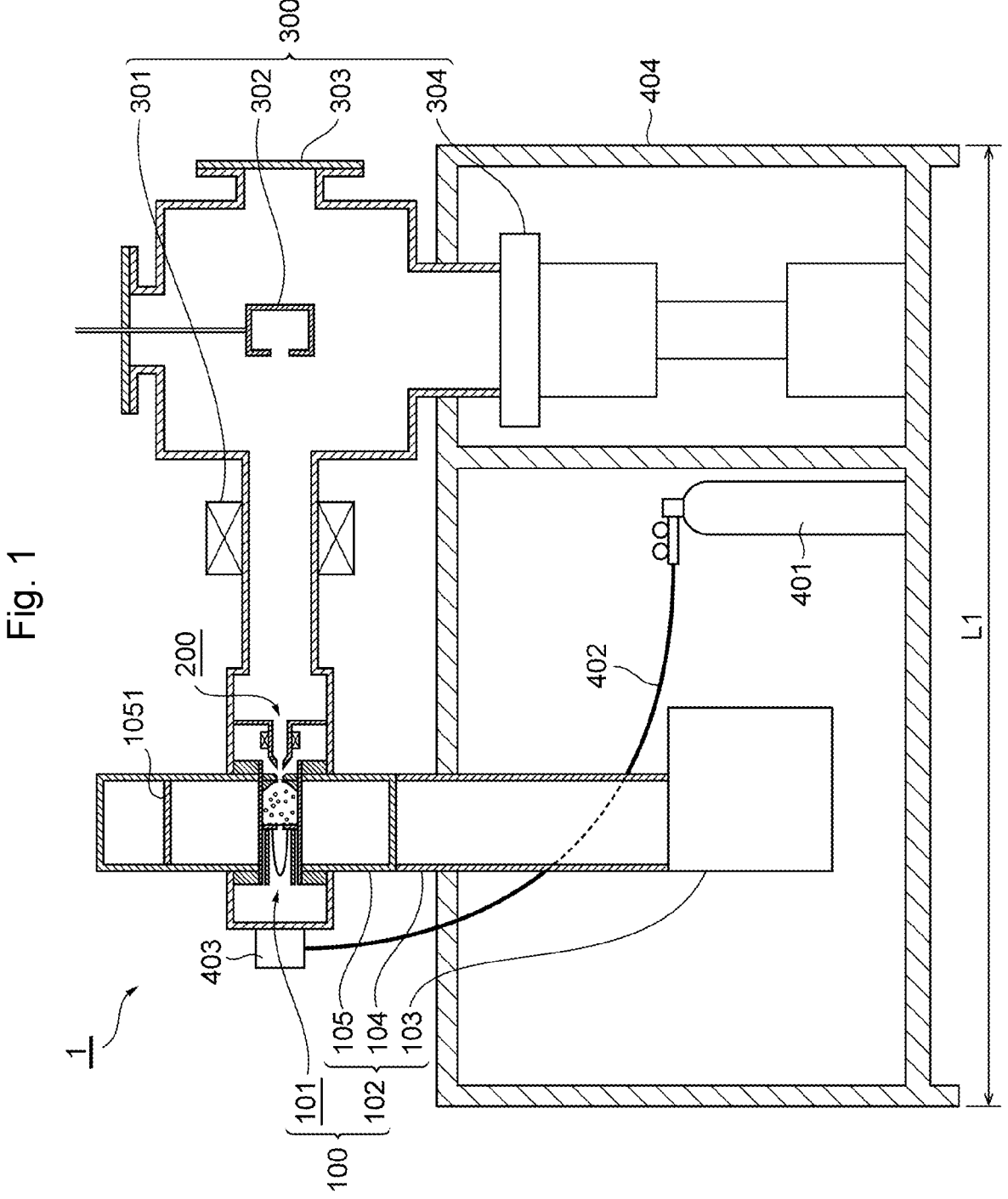
FIG. 1 is a schematic diagram illustrating a configuration of a negative ion beam generating apparatus to which a negative ion source according to the invention is applied.

FIG. 1 is a schematic diagram of a negative ion beam generating apparatus 1 to which a negative ion source according to one embodiment of the present invention is applied. In this embodiment, an example in which a gas sample of carbon dioxide used in the field of mass spectrometry is used as a sample, and mass spectra ($^{12}C$, $^{13}C$, $^{12}CH$, and the like) of ions containing carbon are measured will be described. As the sample, in addition to the gas sample of carbon dioxide, various gas samples including a gas sample of hydrogen effective in the ion beam analysis and the field of medical radiation can be used. Additionally, the present invention is applicable to a liquid sample and a solid sample, for example, as fine particles obtained by using spraying, sputtering, laser ablation, or the like.

The negative ion beam generating apparatus 1 as illustrated in FIG. 1 includes a negative ion source 100 that generates negative ions, an extraction unit 200 that extracts the negative ions in the form of a negative ion beam, and a measurement unit 300 by which mass spectra of some ions containing carbon ions in the negative ion beam are measured. A carbon dioxide gas cylinder 401 that supplies a carbon dioxide gas to the negative ion source 100 is connected to a carbon dioxide gas supply source 403 via a carbon dioxide gas inlet tube 402, and the carbon dioxide gas is supplied into the negative ion source 100 from the carbon dioxide gas supply source 403. The negative ion beam generating apparatus 1 is placed in a cavity 404. The cavity 404 has a horizontal dimension L1 of, for example, 850 mm.

The negative ion source 100 includes a negative ion source main part 101 that generates the negative ions, and an electromagnetic wave irradiation unit 102 that irradiates the negative ion source main part 101 with an electromagnetic wave. In the negative ion source main part 101, a plasma is generated by the electromagnetic wave irradiated from the electromagnetic wave irradiation unit 102, and thermoelectrons are attached on particles that are generated by a reaction of the plasma and the carbon dioxide gas, thereby generating the negative ions. The negative ion source main part 101 will be described in detail later.

The electromagnetic wave irradiation unit 102 includes an electromagnetic wave oscillator 103 that generates an electromagnetic wave, an electromagnetic wave guide unit 104 that propagates the generated electromagnetic wave to the negative ion source main part, and an electromagnetic wave cavity 105 that functions to confine the irradiated electromagnetic wave within a housing.

As the electromagnetic wave oscillator 103, for example, an oscillator including a magnetron can be employed. In this embodiment, for efficiently heating the thermionic emission material, an electromagnetic wave having a frequency in the microwave frequency band is used as the electromagnetic wave. The frequency of the microwave is, for example, 2.45 GHz. However, the frequency is not limited to this, and the frequency only needs to be in a frequency band enabling the efficient heating of the thermionic emission material. The frequency band closely corresponds to a particle diameter of the thermionic emission material described later, and the calculation based on the correspondence provides the frequency band of approximately 10 MHz to 10 GHz. The frequency band corresponds to the shortwave band, the very high frequency band, and the microwave band.

The electromagnetic wave guide unit 104 usually includes an electric power monitor, a tuner, and a circulator. While the material or the shape of the electromagnetic wave guide unit 104 is not limited insofar as the electromagnetic wave can be propagated without attenuation, the electromagnetic wave guide unit 104 can be configured of, for example, a tubular member made of an aluminum alloy.

While the material or the shape of the electromagnetic wave cavity 105 is not limited insofar as the microwave can be confined, the material and the shape that efficiently reflect the electromagnetic wave are preferred for keeping the electromagnetic wave in the cavity and suppressing the attenuation of the electromagnetic wave, and for example, using a rectangular parallelepiped housing having a high conductivity, such as aluminum, is a representative method. For efficiently confining the electromagnetic wave in the electromagnetic wave cavity 105, the shape in which the electromagnetic wave easily resonates is preferred. For example, it is preferred to install a movable plunger 1051 that is movable to make a part of the wall surface constituting the electromagnetic wave cavity 105 movable, thereby allowing the volume and the shape of the inside the electromagnetic wave cavity 105 to be adjusted.

The extraction unit 200 accelerates the negative ions generated in the negative ion source 100 by an electric field, extracts the negative ions as the form of a negative ion beam, and emits the negative ion beam to the measurement unit 300. The configuration of the extraction unit 200 also will be described later.

The measurement unit 300 includes a magnetic deflector 301, a chamber 303, a Faraday cup 302 disposed inside the chamber, and an evacuation system 304 that reduces the pressure inside the chamber.

The process performed by the measurement unit 300 will be described. When the negative ion beam extracted by the extraction unit 200 pass through the magnetic deflector 301 to which a magnetic field is applied, the negative ion beams are bent in respective different directions based on curvature radii corresponding to ratios (m/q) of the mass (m) to the electric charge (q) of the ions. The currents are measured with the Faraday cup 302 disposed based on a desired assumed trajectory of the ions in the chamber 303 vacuumed by the evacuation system 304. By measuring the currents with the Faraday cup 302 while changing the intensity of the magnetic field, the mass spectra are measured.

Next, the negative ion source main part 101 and the extraction unit 200 according to the embodiment of the present invention will be described in detail with reference to FIG. 2 and FIG. 3. In the following description, a case where a rectangular waveguide type is employed for the electromagnetic wave cavity 105 is assumed. It is assumed that the electromagnetic wave propagation mode inside the electromagnetic wave cavity 105 is Transverse Electric (TE) mode, the propagation direction is taken in a z-direction, a longitudinal direction of a rectangular cross-section of the waveguide is taken in an x-direction, and a parallel to the short side direction is taken in a y-direction. Furthermore, the resonance mode when the number of antinodes of the electric field is one in the x-direction, zero in the y-direction, and two in the z-direction is a resonance mode $TE_{102}$. The frequency of the electromagnetic wave is 2.45 GHz. The sample gas is a carbon dioxide gas. The thermionic emission material includes lanthanum hexaboride ($LaB_6$).

[Configuration of Negative Ion Source Main Part 101]

Figure 2:
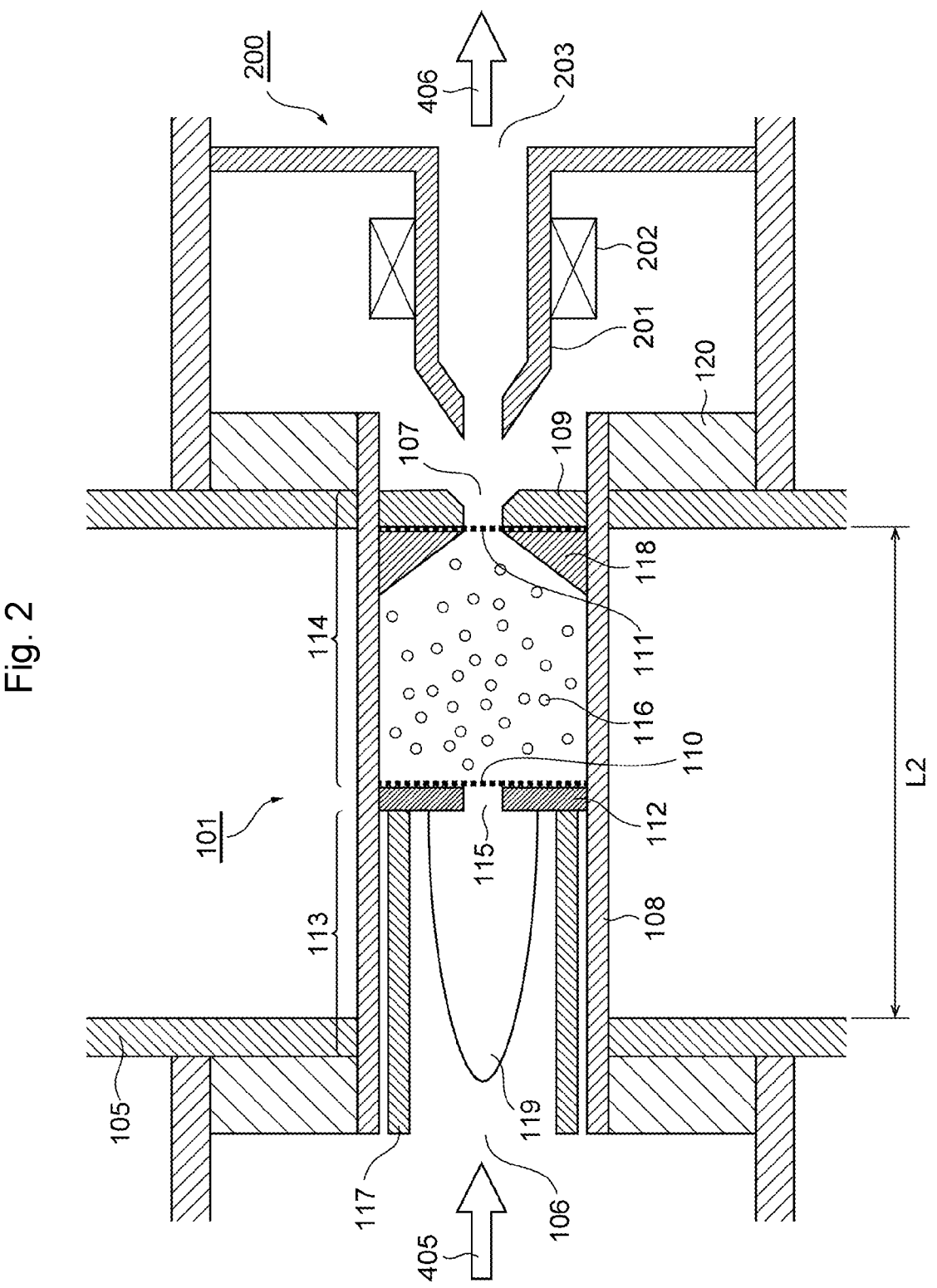
FIG. 2 is a schematic diagram illustrating a configuration of a main part of the negative ion source according to the invention.

As illustrated in FIG. 2, the negative ion source main part 101 is secured inside the chamber 303 by securing members 120 and includes a housing 108 and a generation electrode 109. The housing 108 is provided with an inlet 106 through which carbon dioxide is introduced, and an extraction port 107 through which the negative ions are extracted outside. The generation electrode 109 is disposed in the extraction port 107.

Furthermore, the inside of the housing 108 is divided into a plasma generation region 113 and a negative ion generation region 114 by a partition wall 112 and a separation mesh 110. The plasma generation region 113 is communicated with the inlet 106 through which the sample gas is introduced, and the plasma is generated in the plasma generation region 113. The negative ion generation region 114 is communicated with the extraction port 107 from which the generated negative ions are extracted, and the negative ions are generated in the negative ion generation region 114.

The housing 108, which internally includes the plasma generation region 113 and the negative ion generation region 114, is preferably configured of a dielectric material that is low in electromagnetic wave absorption and high in melting point for enabling the generation of an excited electromagnetic field inside the housing 108 by the irradiation with the electromagnetic wave, and for example, a quartz tube is employable for the housing 108. In this embodiment, a length L2 inside the electromagnetic wave cavity 105 of the housing 108 is 54.6 mm.

Figure 3:
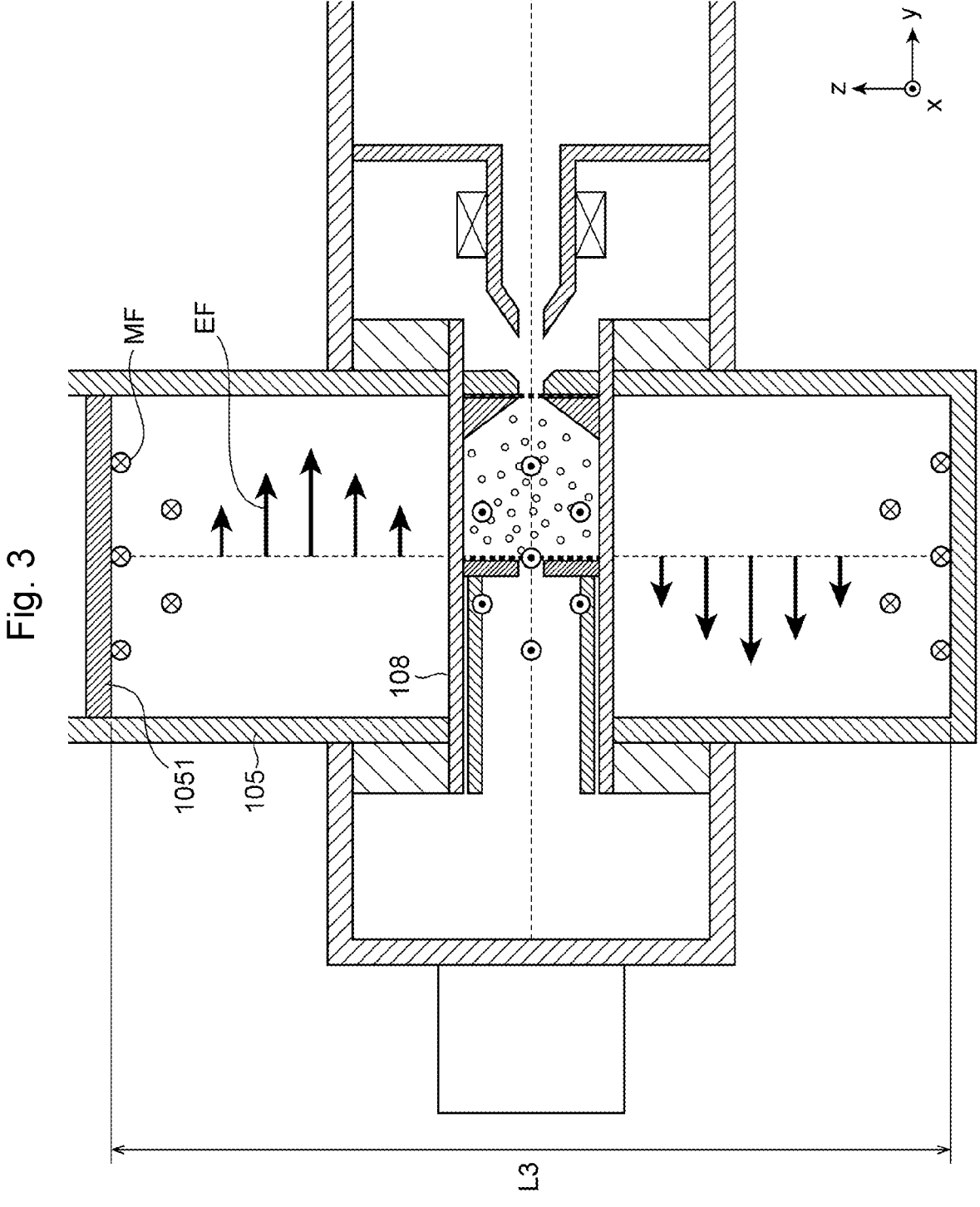
FIG. 3 is a schematic diagram illustrating an example of a positional relation between the main part and an electromagnetic wave cavity of the negative ion source according to the invention.

FIG. 3 is a schematic diagram illustrating a positional relation between the housing 108 and the electromagnetic wave cavity 105, and an electromagnetic field generated in the electromagnetic wave cavity 105 at a certain time point. The axial direction of the housing 108 is the y-direction (parallel to the short side of the rectangular cross-section of the waveguide).

The position on the x-z plane in the electromagnetic wave cavity 105 of the housing 108 is a position corresponding to one half (a/2) of the length of the long side a in the x-direction, and is a position corresponding to one half ($\lambda$/2) of the length L3 (the length of one propagation wavelength $\lambda$) in the z-direction of the electromagnetic wave cavity 105 specified by the resonance mode $TE_{102}$ of the electromagnetic wave in the z-direction in this embodiment. When the frequency of the microwave is 2.45 GHz like this embodiment, the propagation wavelength $\lambda$ is, for example, about 15 cm. This position is a position at which the amplitude of the time-variable magnetic field of the microwave becomes maximum. Therefore, as described later, in this embodiment, the thermionic emission material is heated mainly by a microwave magnetic field. Lanthanum hexaboride ($LaB_6$) is a conductive material (conductivity is approximately that of stainless steel). Accordingly, it is preferred to use the microwave magnetic field for the efficient heating.

The electromagnetic field in the cavity resonance mode $TE_{102}$ includes electric fields EF in the ±y-direction and magnetic fields MF in the ±x-direction, from the view on the waveguide center surface (x=a/2). The state of the magnetic fields MF illustrated in the figure shows the state when the magnetic fields MF became maximum after ¼ period from the moment of the electric fields EF maximum.

While the shape or the dimension of the housing 108 is not specifically limited, in the case that a quartz tube is used as the housing 108, the lager volume of the quartz tube makes the absorption of the electromagnetic wave energy, and thus reducing the plasma generation efficiency. Therefore, it is preferred to design the housing 108 in consideration of various factors such as energy ranges of the electromagnetic wave, and types and amounts of the thermionic emission material to be used.

Refer to FIG. 2 again. The partition wall 112 separating the plasma generation region 113 from the negative ion generation region 114 is provided with an opening 115 in the vicinity of the center of the partition wall 112. Carbon dioxide introduced into the plasma region is dissociated/excited by the reaction with the plasma. The opening 115 allows dissociated/excited particles, for example, carbon atoms and oxygen atoms to pass therethrough.

The opening 115 is provided with the separation mesh 110 of which the mesh opening is smaller than an average particle diameter of the thermionic emission material described later, suppressing the movement of the thermionic emission material 116 filled in the negative ion generation region of the housing 108 from the negative ion generation region to the plasma generation region passing through the opening 115.

The size of the opening 115 can be appropriately designed insofar as the particles dissociated or excited by the plasma as described above are allowed to pass. However, when the size of the opening 115 is increased and the edge of the opening 115 approaches the inner surface of the tube, the particles of the sample gas passing through the vicinity of the edge of the opening 115 to enter the negative ion generation region increase. These particles do not pass through the plasma having the relatively high temperature and high density in the center of the tube, thus increasing the possibility of not being dissociated/excited. Since the particles not dissociated/excited do not contribute to the negative ion generation, it is necessary to suppress the number of such particles, and from this aspect, the size of the opening 115 is preferably about the half of the diameter inside the tube at the maximum.

As the material of the separation mesh 110 disposed to be in contact with the opening 115, for example, ceramics having a high melting point can be used. However, since the particle diameter of the thermionic emission material is about 20 µm to 30 µm in this embodiment as described later, it is preferred to use the separation mesh made of tungsten as the separation mesh 110, which is a metal having a high melting point, capable of including a large number of mesh openings smaller than the particle diameter.

Since the quartz tube is inserted in the y-direction in this embodiment, the surface of the separation mesh 110 is perpendicular to the y-direction (that is, parallel to the x-z plane). The position on the x-z plane of housing 108 is approximately the center (a/2, λ/2) on the x-z plane of the electromagnetic wave cavity 105 as described above. The direction of the magnetic field at this position is parallel to the x-z plane, and most of the components are x components. Accordingly, the size of the magnetic field penetrating the separation mesh 110 (that is, product of the cross-sectional area of separation mesh 110 and magnetic field) can be decreased to minimum, thereby enabling maximally suppressing the absorption of the microwave by the separation mesh 110. This arrangement is preferable in suppressing the heating of the separation mesh 110 and enhancing the controllability to the plasma generation and the controllability to the heating of the thermionic emission material. While the separation mesh 110 is disposed on the surface of the partition plate 112 at the side of the negative ion generation region 114 in this embodiment, it may be disposed on the surface at the side of the plasma generation region 113.

While the partition wall 112 is configured of a material not physically/chemically interfering with the plasma, for example, quartz that is the same material as that of the housing 108, from the aspect of ensuring the larger negative ion generation area, the partition wall 112 is preferably configured of the material that is the same as that of the thermionic emission material.

The partition wall 112 is fixed by a tubular member 117 inserted into the plasma generation region 113. The tubular member 117 has a diameter smaller than the inner diameter of the housing 108. The end portion of the tubular member 117 at the side of the partition wall 112 is communicating with at least the opening 115 of the partition wall 112. The tubular member 117 is preferably configured of the material that is the same as that of the housing 108. In this case, the housing 108 has a double structure provided by the tubular member 117 in the plasma generation region 113.

The plasma generation region 113 is a space in which the gas inside the region is heated by the electromagnetic wave, thereby generating the plasma. In this embodiment, the housing 108 is sealed from the outside air, and therefore, the generated plasma is a plasma in a vacuum.

The negative ion generation region 114 is a region in which the electrons are supplied to the particles dissociated/excited in the plasma generation region 113, thereby generating the negative ions. The mechanism of generating the negative ions will be described later.

In this embodiment, the negative ion generation region 114 is filled with aggregates of small pieces of lanthanum hexaboride (LaB$_6$) as the thermionic emission material 116. The thermionic emission material 116 needs to be low in work function indicating ease of electron emission, to be chemically stable, to be high in melting point, to be high in conductivity, and the like. While the chemical stability, the melting point, and the like of LaB$_6$ are in the same range as those of tungsten conventionally often used, the work function of LaB$_6$ is 2.5 eV and much lower than the work function of tungsten of 4.5 eV. Therefore, LaB$_6$ is preferable as the thermionic emission material.

While cesium is conventionally often used as the electron source, cesium is highly reactive, and has a problem in the chemical stability, for example, easily igniting spontaneously. Besides lanthanum hexaboride (LaB$_6$), crystal of a compound 12CaO·7Al$_2$O$_3$ and C12A7 electride as an isotypic compound having a crystal structure equivalent thereto are employable. Additionally, a material appropriate as the thermionic emission material, for example, having low work function, can be used as a material substituted for LaB$_6$ or C12A7 electride.

In this embodiment, the small-piece material filled in the negative ion generation region 114 has a granular shape. While the average particle diameter of the small-piece material is preferably, for example, about 0.01 mm to 10.0 mm, the average particle diameter of the small-piece material can be designed in consideration of various factors such as the size of the housing 108 and the effect on dissociated/excited particles. While the small piece preferably has a granular shape, its shape is not limited to the granular. The small piece is only required to have a shape in which the area exposed to the dissociated/excited particles is increased. Besides the granular shape, the shape such as a powder shape, a plate shape, and a tubular shape can be employed. On the premise that the material containing lanthanum hexaboride (LaB$_6$) and having the low work function is a conductive material in this embodiment, a measure of the particle diameter can be obtained as follows based on the knowledge described in "New Microwave Energy Technology and its Applications" (edited by editorial board of latest edition of microwave energy and applied technology, published by Industrial Technology Service Center, 11, 2014, p. 89-92, 907-910), which is hereinafter referred to as "Non-Patent Literature." In the case of conductive materials, the particle diameter providing the highest heating efficiency is approximately double of a penetration length (skin depth, in other words) of the electromagnetic wave into the conductive material in the microwave frequency domain. The penetration length (indicated by δ) of the electromagnetic wave is expressed by δ=[2/(σωμ)]$^{0.5}$. Here, σ is a conductivity, μ is a vacuum magnetic permeability (4π×10$^{-7}$ H/m), and ω is an angular frequency of the electromagnetic wave and expressed by ω=2πf using a frequency f. In this embodiment, using the LaB$_6$ conductivity σ=8.3×10$^5$ (Ωm)$^{-1}$ and the microwave frequency f=2.45 GHz, δ=11 μm is obtained. Accordingly, by doubling δ=11 μm, 22 μm (0.022 mm) is obtained as a measure of the particle diameter. Based on the result, in this embodiment, the particle diameter of LaB$_6$ is set to from 20 μm to 30 μm (0.02 mm to 0.03 mm) also considering the availability of LaB$_6$ materials, and it can be said to be the most preferable average particle diameter. The measurement of the average particle diameter is performed by a scanning electron microscope observation.

A converging member 118 is disposed in the extraction port side of the negative ion generation region 114. The converging member 118 is for smoothly extracting the negative ions generated in the negative ion generation region 114 to the outside. One end of the converging member 118 is communicated with at least the extraction port 107, and the other end having a diameter approximately the same as a diameter of the negative ion generation region 114. The converging member 118 guides the negative ions inside the negative ion generation region 114 so as to move toward the extraction port 107. The diameter of the extraction port 107 is preferred to be approximately 1 mm to 2 mm. This is because the efficiency of the negative beam extraction decreases with decreasing the diameter, although the smaller diameter makes the beam position more accuracy.

An electrode mesh 111 is disposed at the extraction port 107 to suppress the movement of the thermionic emission material 116 filled in the negative ion generation region to the housing 108 from the negative ion generation region to the extraction unit 200 passing through the extraction port 107. The electrode mesh 111 is provided with mesh openings smaller than the above-described average particle diameter of the thermionic emission material.

The electrode mesh 111 is preferred to be made of a conductive material to function as an extraction electrode of the negative ions. The electric potential of the electrode mesh 111 can be adjusted from an atmosphere side, i.e., the outside the chamber 303 through an electrical cable (not illustrated). In this embodiment, structurally, the electrode mesh 111 is in contact with the extraction port 107, and electrically connected to the electromagnetic wave cavity 105. Therefore, the electric potential of the electrode mesh 111 is the same as the electric potential of the electromagnetic wave cavity 105.

Since the electrode mesh 111 is in contact with the thermionic emission material heated to a high temperature, a metal with a high melting point, such as tungsten, is preferable.

[Configuration of Extraction Unit 200]

The extraction unit 200 includes an extraction electrode 201 opposed to the generation electrode 109, a permanent magnet 202 disposed so as to surround the extraction electrode 201, and an outlet 203 from which a negative ion beam 406 is emitted. The extraction electrode 201 is electrically insulated from the chamber 303, and a positive voltage is applied to the extraction electrode 201 with respect to the generation electrode 109. The permanent magnet 202 is used for removing electrons included in the negative ion beam 406.

[Principle of Negative Ion Beam Generation]

The principle of generating the negative ion beam in this embodiment will be described. First, a plasma 119 is generated in the plasma generation region 113 as follows. The electromagnetic wave irradiated from the electromagnetic wave irradiation unit 102 and propagated inside the electromagnetic wave guide unit 104 is confined in the electromagnetic wave cavity 105, thereby forming a standing wave. The housing 108 is disposed therein as described above, thereby generating an excited electromagnetic field inside the housing 108. The excited electromagnetic field causes discharge, thus leading to ionization of the gas inside the housing 108. Since the housing 108 is disposed at the position at which the magnetic field becomes maximum in the electromagnetic wave cavity in this embodiment, the plasma 119 at tens of thousands of degrees Celsius is generated mainly by the induced electromotive force due to the time-variable magnetic field.

When a carbon dioxide gas 405 is introduced in the plasma generation region 113 in the state where the plasma 119 is generated, carbon dioxide molecules dissociate into carbon atoms and oxygen atoms, or dissociate into carbon monoxide molecules and oxygen atoms. Alternatively, an excited state of carbon dioxide molecules and carbon monoxide molecules is generated. These dissociated or excited particles subsequently pass through the opening 115 of the partition wall 112 to be introduced in the negative ion generation region 114.

In the negative ion generation region 114, similarly to the plasma generation region 113, an excited standing-wave of the electromagnetic field is generated by the electromagnetic wave propagated from the electromagnetic wave irradiation unit 102, the thermionic emission material 116 is heated to about 1200° C. by the electromagnetic field, thereby causing a state where the electron binding of the thermionic emission material is effectively reduced or a state where the electron energy exceeds a vacuum level and electrons are emitted. That is, the thermionic emission material generates/emits thermoelectrons by heating. Note that the electrons in these states are referred to as Thermal electrons in some cases. The generated/emitted thermoelectrons are highly reactive, and become electrons attached to the dissociated/excited particles in the negative ion generation region 114. In this embodiment, heating the thermionic emission material 116 is based on an eddy current caused by the time-variable magnetic field. The eddy current causes Joule heating. According to the Non-Patent Literature, while the electromagnetic wave penetration length is from several $\mu$m to several tens of $\mu$m in the individual conductive grains as described above, it has been known that the penetration length reaches several cm in a macroscopic aggregate of the grains. Therefore, in the case of this embodiment, the size in the macroscale of the thermionic emission material 116 is restricted to about several cm at the maximum.

When the dissociated/excited atoms introduced from the plasma generation region 113 as described above pass through the negative ion generation region 114, the liberated electrons on or near the surface of the thermionic emission material 116 are attached to the dissociated/excited atoms, thereby generating the negative ions. For the excited molecules introduced from the plasma generation region 113, the thermoelectrons on or near the surface of the thermionic emission material 116 are attached to the excited molecules, thereby causing the dissociation and generating negative ions.

The generated negative ions become the negative ion beam 406 provided with a velocity and an energy by the extraction electrode 201 to which the positive voltage is applied with respect to the generation electrode 109 disposed around the extraction port 107. After the electrons interfering with the measurement are removed by the permanent magnet 202, the negative ion beam 406 passes through the outlet 203, and is emitted to the measurement unit 300.

From the aspect of measuring carbon-14 ($^{14}$C) in the mass spectrometry, the plasma generated in the plasma generation region 113 contributes also to dissociating and then removing molecules ($^{12}$CH$_2$ and $^{13}$CH) having the approximately same mass that interfere with the $^{14}$C measurement. Additionally, the plasma generated in the plasma generation region 113 contributes to generating the negative ions through the dissociation process of the excited molecular negative ions. The reason why the negative ion is the measurement target in this embodiment is to separate $^{14}$C from nitrogen-14 ($^{14}$N) as an isobar of $^{14}$C (since $^{14}$N is not converted into the negative ion, $^{14}$N is separatable from $^{14}$C).

The embodiment of the present invention has been described above. As this embodiment, by filling the negative ion generation region 114 with the aggregates of small pieces of the thermionic emission material 116, each of the small pieces of the thermionic emission material 116 is heated by the excited electromagnetic field, thereby generating the electrons weakly bounded to the thermionic emission material or emitting the thermoelectrons. Accordingly, compared with the case where the filament-shaped thermionic emission material was used like the conventional one, the area of the exposure of the thermionic emission material is increased. This results in the number of thermoelectrons which can be attached to the particles is significantly increased. The increase of thermoelectrons significantly improves the efficiency of the negative ion generation in which the dissociated/excited particles generated in the plasma generation region 113 capture the thermoelectrons in the negative ion generation region 114 to be converted into negative ions.

Furthermore, in the configuration of this embodiment, the plasma generation region 113 for dissociating/exciting carbon dioxide by the high-temperature plasma is separated from the negative ion generation region 114 for converting the dissociated/excited particles into negative ions. Accordingly, the loss of the negative ions due to electron detachment of the generated negative ions by the high-temperature plasma can be suppressed. Note that a plasma at a relatively low temperature (approximately from 1000° C. to 2000° C.), which is assumed from a thermal equilibrium state that may be provided between the thermionic emission material 116 and the plasma, is possibly generated in the negative ion generation region 114. However, since the electron temperature of the low-temperature plasma is low, it is considered that almost no generated negative ions lose the attached electron. While the high frequency discharge using the electromagnetic wave cavity is employed as the plasma generation method in this embodiment, various methods such as direct current discharge and laser ablation are applicable in addition to the high frequency discharge.

With the configuration of the present invention, since the thermionic emission material is used, it is not necessary to use cesium as the electron source used in the conventional negative ion source. Since cesium is highly reactive and ignites spontaneously in air, the present invention is effective also from the aspect of safety.

While the example of using carbon dioxide as the sample is described in the above-described embodiment, boron, phosphorus, arsenic, or the like can be employed as the sample in addition to carbon dioxide. They are used for ion implantation in the semiconductor manufacturing process, and it can be expected that the damage on the semiconductor surface is suppressed compared with the positive ions that are generally used.

Figure 4:
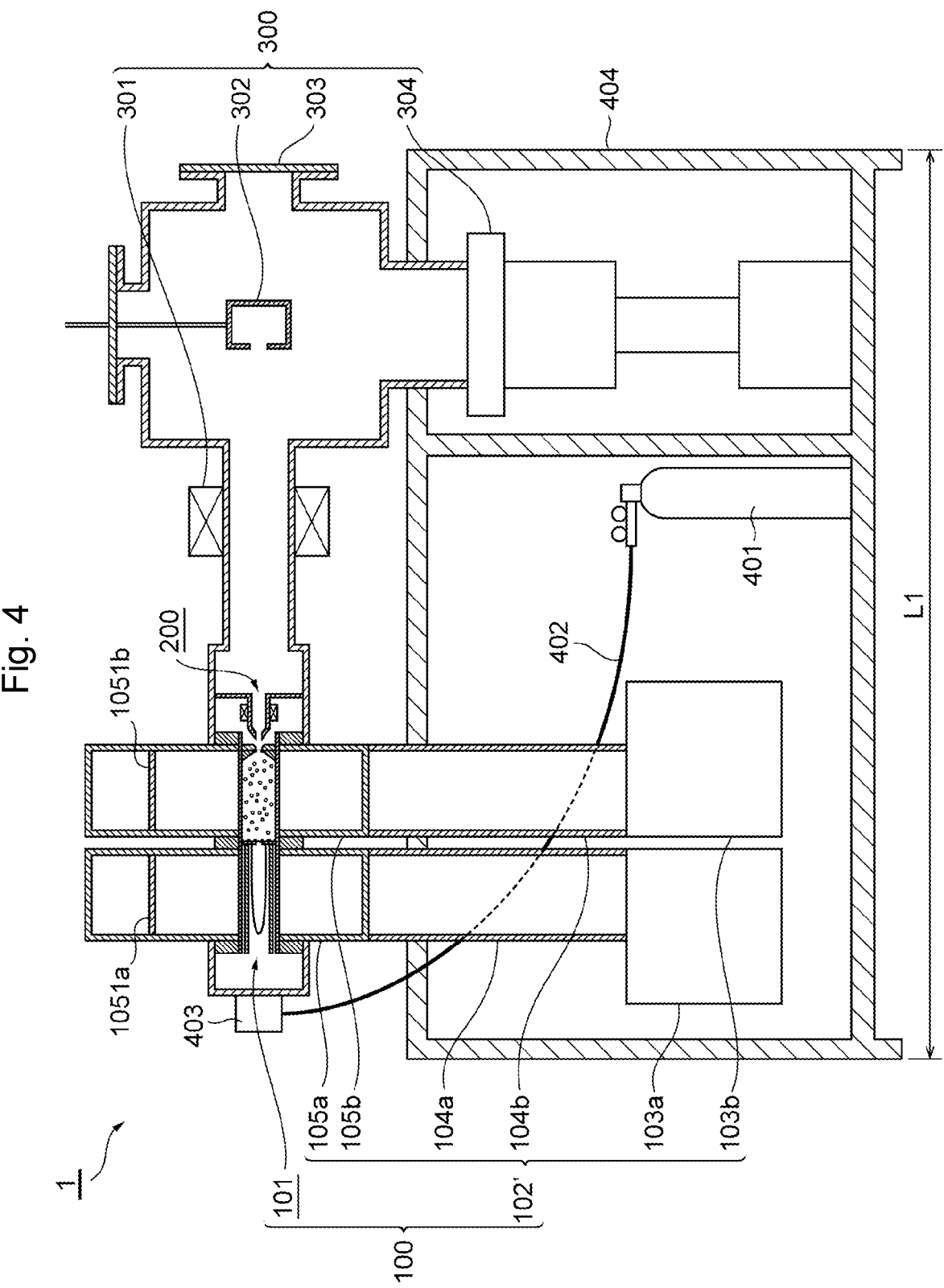
FIG. 4 is a schematic diagram illustrating another example of the configuration of the negative ion beam generating apparatus to which the negative ion source of the invention is applied.

FIG. 4 illustrates another configuration of the electromagnetic wave irradiation unit 102 in the negative ion beam generating apparatus 1 described with reference to FIG. 1. An electromagnetic wave irradiation unit 102' in FIG. 4 is different from the electromagnetic wave irradiation unit 102 illustrated in FIG. 1 in that the electromagnetic wave irradiation unit 102' includes a first electromagnetic wave oscillator 103*a* that generates a first electromagnetic wave, a first electromagnetic wave guide unit 104*a* that propagates the first electromagnetic wave to a plasma generation region 113, a first electromagnetic wave cavity 105*a* that confines the first electromagnetic wave into the plasma generation region 113, a second electromagnetic wave oscillator 103*b* that generates a second electromagnetic wave, a second electromagnetic wave guide unit 104*b* that propagates the second electromagnetic wave to a negative ion generation region 114, and a second electromagnetic wave cavity 105*b* that confines the second electromagnetic wave into a negative ion generation region. Since other configurations are similar to those of FIG. 1, the explanations will be omitted. Plungers 1051*a* and 1051*b* enabling the adjustment of the volumes inside the cavities are disposed in the first and the second electromagnetic wave cavities 105*a* and 105*b*.

That is, the above-described configuration means that the electromagnetic wave irradiated on the plasma generation region 113 and the electromagnetic wave irradiated on the negative ion generation region 114 can be separately controlled. Accordingly, for example, with the same frequency (for example, 2.45 GHz) and the different outputs (for example, the maximum output of the first electromagnetic wave oscillator is 1 kW, and the maximum output of the second electromagnetic wave oscillator is 1.5 kW) of the electromagnetic waves, the optimum input powers can be easily adjusted for the dissociation/excitation in the plasma generation region 113 and the thermoelectron generation and the electrons attachment in the negative ion generation region 114.

The embodiments of the present invention have been described above with reference to the drawings. The technical scope of the present invention is not limited to the range of the description of the above-described embodiments, and various modifications are included without departing from the main features of the present invention. Therefore, the above-described embodiments are merely examples, and it should not be construed in a limiting sense. For a part of the configuration of each embodiment, addition, removal, or replacement by the other configuration is allowed, and they are all included in the present invention.

DESCRIPTION OF SYMBOLS

100 Negative ion source
101 Negative ion source main part
102 Electromagnetic wave irradiation unit
103, 103*a*, 103*b* Electromagnetic wave oscillator
104, 104*a*, 104*b* Electromagnetic wave guide unit
105, 105*a*, 105*b* Electromagnetic wave cavity
106 Inlet
107 Extraction port
108 Quartz tube (housing)
109 Generation electrode
110 Separation mesh
111 Electrode mesh
112 Partition wall
113 Plasma generation region
114 Negative ion generation region
115 Opening
116 Thermionic emission material
117 Tubular member
118 Converging member
119 Plasma
200 Extraction unit
201 Extraction electrode
202 Permanent magnet
203 Outlet
300 Measurement unit
301 Magnetic deflector
302 Faraday cup
303 Chamber
304 Evacuation system
401 Carbon dioxide gas cylinder
402 Carbon dioxide gas inlet tube
403 Carbon dioxide gas supply source
404 Cavity
405 Carbon dioxide gas (sample gas)
406 Negative ion beam

What is claimed is:

1. A negative ion source comprising
a housing including:
  an inlet from which a sample is introduced;
  a plasma generation region communicated with the inlet, a plasma being generated by discharge in the plasma generation region;
  a negative ion generation region in which particles dissociated or excited by a reaction of the generated plasma with the sample are converted into negative ions; and
  an extraction port communicated with the negative ion generation region, the generated negative ions being extracted outside through the extraction port, wherein the negative ion generation region is filled with a thermionic emission material for generating thermo-electrons by heating, and wherein the thermionic emission material is an aggregate of small pieces.

2. The negative ion source according to claim 1, further comprising an electromagnetic wave irradiation unit that generates an electromagnetic wave, and irradiates the housing with the electromagnetic wave.

3. The negative ion source according to claim 2, wherein the electromagnetic wave irradiation unit includes:

a first electromagnetic wave oscillator that generates a first electromagnetic wave;

a first electromagnetic wave guide unit that propagates the first electromagnetic wave to the plasma generation region;

a second electromagnetic wave oscillator that generates a second electromagnetic wave; and a second electromagnetic wave guide unit that propagates the second electromagnetic wave to the negative ion generation region.

4. The negative ion source according to claim 1, further comprising a partition wall disposed in a boundary between the plasma generation region and the negative ion generation region, wherein the partition wall is provided with an opening through which the particles are allowed to pass.

5. The negative ion source according to claim 4, wherein the partition wall is configured of a material that is same as the thermionic emission material.

6. The negative ion source according to claim 4, wherein a mesh member that covers at least the opening is disposed on a surface of the partition wall.

7. The negative ion source according to claim 1, wherein a converging member is disposed in the extraction port side of the negative ion generation region, the converging member has one end provided with an extraction port side opening communicated with the extraction port and having a diameter smaller than an inner diameter of the housing and another end provided with a negative ion generation region side opening having an inner diameter that is same as the inner diameter of the housing.

8. The negative ion source according to claim 1, wherein the thermionic emission material includes lanthanum hexaboride.

9. The negative ion source according to claim 2, wherein the electromagnetic wave has a frequency in a frequency band of a shortwave, a very high frequency, or a microwave.

10. The negative ion source according to claim 1, wherein the sample is carbon dioxide or hydrogen.

11. The negative ion source according to claim 1, wherein the small pieces have at least one of a granular shape, a powder shape, a plate shape, and a tubular shape.

12. A negative ion generation method using the negative ion source according to claim 1, comprising:

irradiating the plasma generation region and the negative ion generation region with the electromagnetic wave;

introducing the sample into the plasma generation region through the inlet; and passing the generated particles through the negative ion generation region.

13. The negative ion source according to claim 11, wherein the small pieces have the granular shape.

14. The negative ion source according to claim 13, wherein an average particle diameter of the small pieces is 0.01 mm or more and 10.0 mm or less.

* * * * *